United States Patent [19]
Kitao et al.

[11] Patent Number: 5,668,528
[45] Date of Patent: Sep. 16, 1997

[54] APPARATUS FOR ACTUATING THE SAFETY DEVICES FOR VEHICLE OCCUPANTS

[75] Inventors: Shigetaka Kitao; Ayumu Kimura, both of Himeji; Yasuhiko Ootani, Kobe; Isamu Hitomi, Kobe; Akihiko Kuroiwa, Kobe, all of Japan

[73] Assignees: Sensor Technology Co. Ltd., Kobe; Nippon Kayaku Kabushiki-Kaisha, Tokyo, both of Japan

[21] Appl. No.: 564,269

[22] PCT Filed: Jun. 27, 1994

[86] PCT No.: PCT/JP94/01028

§ 371 Date: Dec. 28, 1995

§ 102(e) Date: Dec. 28, 1995

[87] PCT Pub. No.: WO95/00369

PCT Pub. Date: Jan. 5, 1995

[30] Foreign Application Priority Data

Jun. 28, 1993 [JP] Japan ..................... 5-216812

[51] Int. Cl.6 .................................. B60Q 1/00
[52] U.S. Cl. ................... 340/436; 340/438; 340/669; 280/734; 280/735; 180/271; 180/282
[58] Field of Search ..................... 340/436, 438, 340/669; 307/10.1, 121; 180/282, 271; 280/734, 735

[56] References Cited

U.S. PATENT DOCUMENTS

| | | | |
|---|---|---|---|
| 5,080,395 | 1/1992 | Morota et al. | 340/436 |
| 5,119,901 | 6/1992 | Buie | 340/436 |
| 5,122,780 | 6/1992 | Midorikawa et al. | 340/438 |
| 5,166,880 | 11/1992 | Furui | 340/436 |
| 5,187,465 | 2/1993 | Stonerook et al. | 340/438 |
| 5,205,582 | 4/1993 | Shiga et al. | 280/735 |
| 5,232,243 | 8/1993 | Blackburn et al. | 280/732 |
| 5,424,584 | 6/1995 | Matsuda et al. | 307/10.1 |

*Primary Examiner*—Jeffery Hofsass
*Assistant Examiner*—Ashok Mannava
*Attorney, Agent, or Firm*—Oblon, Spivak, McClelland, Maier & Neustadt, P.C.

[57] ABSTRACT

An apparatus for actuating a plurality of safety devices equipped in a vehicle for protecting occupants from an impact of a collision has a plurality of squibs (4,5) connected in series with each other so as to form a series circuit (6) and ignited by a current flowing through and conformed to one and the same standard. A power source (3) supplies electrical energy to the series circuit (6), and a collision detector (7) allows a current to flow from the power source (3) to said series circuit (6) when detecting a collision. A required energy for igniting all of the squibs (4,5) is thus supplied before the series circuit (6) opens electrically at one squib.

7 Claims, 9 Drawing Sheets

Resistance = 1.91 (Ω)
Current = 5.12 (A)
t2 = 0.19 (ms)

Resistance = 1.92 (Ω)
Current = 5.20 (A)
t1 = 0.39 (ms)

APPARATUS FOR ACTUATING THE SAFETY DEVICES FOR VEHICLE OCCUPANTS

FIELD OF THE INVENTION

The present invention relates to an apparatus for actuating a plurality of safety devices in a vehicle for protecting occupants from an impact of a collision, more especially, it relates to an apparatus for actuating the plurality of safety devices having a plurality of squibs respectively which are ignited by a current flowing through.

BACKGROUND OF THE INVENTION

There are some known safety devices for protecting occupants in a vehicle from an impact of a collision, having a squib which is actuated by a electric current flowing through it. One of them is the safety device which uses an airbag which is inflated during a collision, and another of them is the safety device which uses a pretensioner of a seat belt which winds the seat belt at a collision so as to draw the occupants up to the back of the seat. A driver's seat is provided with the above airbag and the above pretensioner of the seat belt. And a passengers' seats is also provided with the airbag and the pretensioner of the seat belt.

In recent years, great importance is attached to the safety of occupants in a vehicle. Consequently, there is a growing tendency toward providing a vehicle with a plurality of safety devices for protecting the occupants. There is one idea that one actuater is provided to each of a plurality of squibs in a plurality of safety devices respectively. However, it is generally thought that all the squibs are actuated by a common actuater in order to reduce the number of parts and thereby make the cost concerning the safety devices inexpensive.

In case that a plurality of squibs are actuated by a common actuater, it is necessary to energize all of the squibs with certainty in a shortest time. Therefore, all of the squibs are connected in parallel with each other, and a parallel circuit resulting therefrom is connected to a power source such as a capacitor charged by a battery. In case of the parallel circuit, if one of these squibs is short-circuited, it will result in no current flowing through the remaining squibs. This problem is overcome by providing each squib with current limiter means such as a resistor. Consequently, an amount of a required current at the power source becomes large by reason that the total amount of a current from a power source into all squibs is equal to the sum of the currents of each squib with a resistor. As a result, the power source increases in volume and weight. This is one of factors that prevents the actuater from decreasing in size and weight.

In a further previously proposed arrangement, as described in the Japanese Laid Open Patent Application No. 4-147846, there is an apparatus for actuating the safety devices comprising a plurality of squibs connected in series with each other so as to form a series circuit which are connected to a power source, and a plurality of bypass means connected respectively to the plurality of squibs in parallel, where a current flows through the bypass means when the series circuit opens electrically at one squib. The bypass means are required by reason that the current will not flow through the remaining squibs if the series circuit opens electrically at one squib without bypass means. The bypass means may consist of a voltage regulation diode or a transistor circuit. This prior apparatus has a effect that an amount of required current for a plurality of squibs connected in series with each other is less than that for squibs connected in parallel with each other.

However, This prior apparatus has a problem that the number of parts increases because each squib is provided with the provision of bypass means such as a voltage regulation diode or a transistor circuit. This is one of factors that prevents the apparatus for actuating the safety devices from decreasing in size and weight.

In view of the above-described problems, it is an object of the invention to provide an apparatus for actuating the safety devices for vehicle occupants, comprising a plurality of squibs included in a plurality of safety devices for vehicle occupants respectively, which are connected in series with each other so as to form a series circuit, and a power source connected to the series circuit, wherein all squibs are ignited with certainty even if the series circuit is broken at one squib without bypass means connected in parallel with the squib.

SUMMARY OF THE INVENTION

One of features of the present invention is that an apparatus actuates a plurality of safety devices equipped in a vehicle for protecting occupants from an impact of a collision, comprising a plurality of squibs included in said plurality of safety devices respectively, which are connected in series with each other so as to form a series circuit and ignited by a current flowing through and conformed to one and the same standard each other, a power source for supplying electrical energy to said series circuit, and a collision detector for allowing a current to flow from the power source to said series circuit when detecting a collision; wherein a required energy for igniting all of said squibs in said series circuit is supplied to them from said power source before said series circuit opens electrically at one squib.

A fundamental concept of this present invention is that a required energy for igniting all of said squibs are supplied to all of said squibs before the series circuit is broken at one squib, whereby it does not become necessary to connect each squib with a bypass circuit in parallel such as a voltage regulation diode or a transistor circuit. This unnecessity enables the apparatus for actuating the safety devices to reduce the number of parts and to decrease in size and weight together with an effect of connecting the squibs in series which is given to reducing the amount of the current of the power source.

The squibs conforming to one and the same standard have each of their resistances of their bridge wires engaging a initiating composition in the squib within a prescribed range and each of their voltage build-up rates measured with a feeble current flowing through the bridge wire in a prescribed time within a prescribed range. The squibs such as above can be controlled so that straggling or variance range of their tightness of engagement between the bridge wire and the initiating composition may be narrow.

According to the invention, it is required that a straggling range of supplied energy to each squibs till the series circuit opens electrically is narrow because a comparatively large current flows through the series circuit of squibs till a bridge wire in one squib is melted into a breakage, and then all the squibs start igniting by energy supplied to each squibs before the aforesaid bridge wire is melted into a breakage. This requirement will be met by squibs such as that each initial discharged current from the power source such as a capacitor is 3 amp or more provided all squibs conform to one and the same standard each other and each of their resistance of the bridge wires is 2 ohms with an error confined within a prescribed tolerance.

According to another feature of the present invention, the series circuit includes a plurality of squibs actuating the different kinds of safety devices respectively. For example, one of them actuates the safety device with air bag, another of them actuates the safety device with a pretensioner of seat belt.

According to further feature of the present invention, the series circuit includes a plurality of squibs actuating the safety devices for protecting a passenger except a driver in a vehicle. One of them actuates the safety devices with air bag, another of them actuates the safety device with a pretensioner of seat belt. And a passenger detector at a passenger's seat and a restraining means are further comprised. The passenger detector is used for detecting a passenger at a passenger's seat and the restraining means is used to restrain flowing a current through the series circuit so as not to actuate the safety devices at the passenger's seat when the passenger detector does not find any occupant at the passenger's seat.

According to further another feature of the present invention, the series circuit includes a plurality of squibs actuating the safety devices for protecting both a passenger and a driver in a vehicle. And also, a passenger detector at a passenger's seat and a restraining means are further comprised. The passenger detector is used for detecting a passenger at a passenger's seat and the restraining means is used to restrain flowing a current through the squibs for the passenger so as not actuate the safety devices at the passenger's seat when the passenger detector does not find any occupant at the passenger's seat.

BEST MODES OF OPERATION

Figure 1:
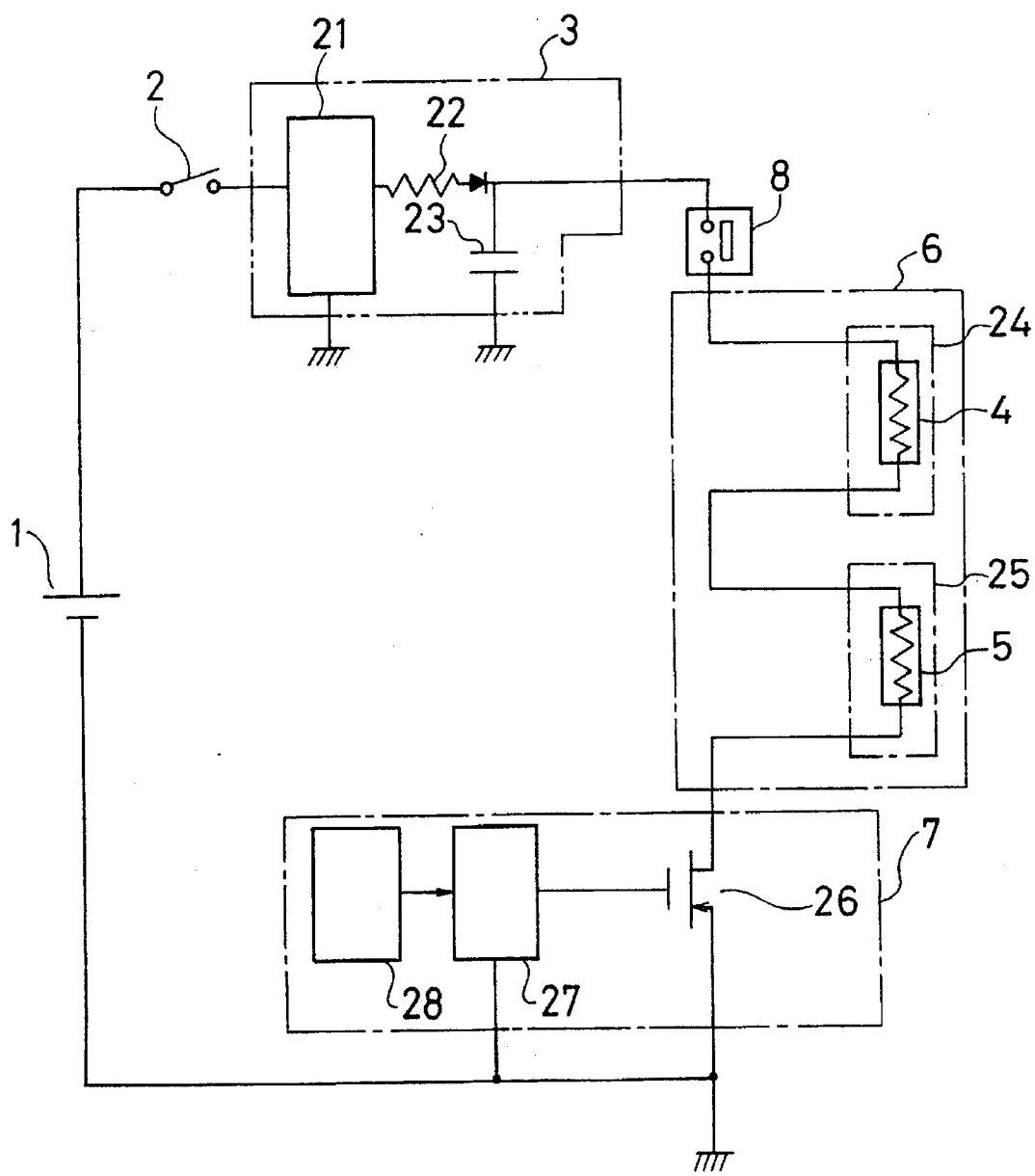
FIG. 1 is a schematic illustration of a circuit utilized in this invnetion.

The invention, as to its best modes of operation, may be understood by reference to the following description taken in connection with the accompanying drawings. FIG. 1 shows a circuit of the present invention. For the sake of clarity, only an outline of the circuit is given in FIG. 1. The circuit includes a battery 1, a power source 3, a safety sensor 8, a series circuit 6 and a collision detector circuit 7.

The power source 3 comprises a booster circuit 21, a resistance 22 and a capacitor 23. The booster circuit 21 is supplied electrical energy through an ignition switch 2 from the battery 1.

The series circuit 6 has two squibs 4 and 5 connected in series with each other, so that the series circuit 6 is connected to the power source 3.

The squib 4 is incorporated in a means for inflating an airbag 24 for protecting a driver and the squib 5 is incorporated in a means for inflating an airbag 25 for protecting a passenger.

The collision detector circuit 7 is connected to the series circuit 6. The collision detector circuit 7 includes a semiconductor switch 26, a judgment circuit 27 and an acceleration sensor 28. A gate of the semiconductor switch 26 is connected to the judgment circuit 27. The judgment circuit 27 is connected to the acceleration sensor 28 including a piezoelectric crystal element. The safety sensor 8 connects the power source 3 to the series circuit 6. The aim of the provision of a safety sensor 8 just ahead of the squibs 4 and 5 is to prevent the squibs 4 and 5 from being ignited by ground fault.

Figure 2:
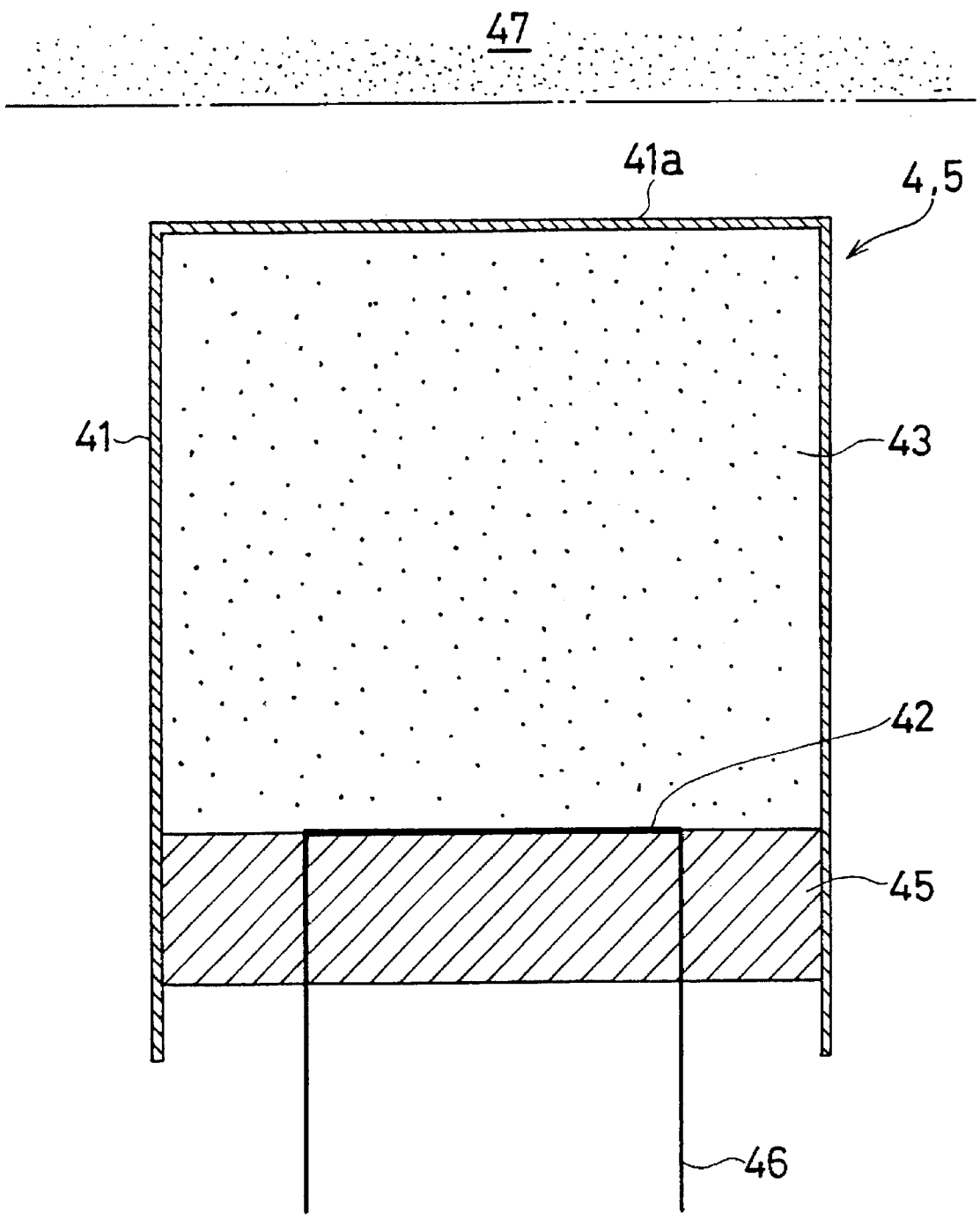
FIG. 2 is a sectional view of a squib for use in connection with the present invention.

Now reference will be specifically made to FIG. 2 which illustrates the construction of the squibs 4 and 5. Each of the squibs 4 and 5 includes a cylinder 41 adapted to contain initiating composition 43, for which a proper seal is obtained by a sealing material 45. The inner surface of the sealing material 45 serves to support a bridge wire 42 which receives a supply of current through leading wires 46. The leading wires 46 project toward the outer side through the sealing material 45.

The resistance of the bridge wire 42 for each of the squibs 4 and 5 is allowed to fall within a range between 1 and 3 ohms, the straggling range of the resistance is confined within the tolerances of ±15% because the quantity of produced heat in a wire is proportional to the resistance of the wire and the igniting time for igniting the initiating composition is inversely proportional to the quantity of produced heat in the wire. The bridge wire 42 is made of a nickel-chromium alloy and has a diameter of 25 to 45 microns because if the bridge wire 42 has a large diameter, a straggling range with respect to the igniting time will become wide due to the quantity of produced heat in its wire. An agent which has a good ignitability such as a mixture of zirconium and potassium perchlorate is used as the initiating composition 43 contained in the squibs 4 and 5. The sealing material 45 is made of ceramic having a low electric conductivity such as forsterite. The aforesaid materials serve to decrease the straggling range with respect to the igniting time.

The initiating composition 43 is ignited by the produced heat in the bridge wire 42 when it receives a supply of current. An un-shown indentation which is on the top end wall of the cylinder 41 tears and a flame spouts out when the internal pressure of the cylinder 41 has come up to a prescribed intensity. So that, gas generant for inflating an airbag is burnt by the flame. As occasion demands, an enhancer 47 is fired by the flame from the squib and then the gas generant is burnt by the fired enhancer 47.

There shall now be described one action of the apparatus of the invention in connection with FIG. 1. When the ignition switch 2 is closed, the battery 1 supplies electrical energy to the booster circuit 21 which functions as a voltage stabilizer in view of the terminal voltage of the battery 1 varying greatly between 8 and 16 volts. The booster circuit 21 will insure that the output voltage thereof is high enough to ignite a plurality of squibs. The capacitor 23 is charged through the resistance 22. The aforesaid high output voltage is applied to the series circuit 6. The safety sensor 8 is closed and the collision sensor 28 detects the collision and outputs a signal to the judgement circuit 27 when a collision occurs. The judgement circuit 27 outputs a signal for actuating the semiconductor switch 26 when the judgement circuit 27 judges an event to be a collision. So that, the same current flows through the squibs 4 and 5 and thereby squibs 4 and 5 are ignited due to a produced heat and then the airbags 24 and 25 are inflated.

By the way, in case of a plurality of squibs connected in series with each other, a high voltage must be supplied to a plurality of squibs. The present invention solves this problem to use the booster circuit 21 which has come to be used in recent years. So, there is no problem in supplying a high voltage to a plurality of squibs connected in series with each other. And also, the squibs break (i.e. a circuit opens electrically at the squibs) caused by the explosion (i.e. ignition) of the initiating composition. In case of a plurality of squibs connected in series with each other, when one squib breaks, a current stops flowing through all the squibs connected in series with each other. The present invention solves this problem in a simple and efficient manner by employing the squibs conforming to one and the same standard. Such squibs allow electrical energy to be supplied to the series circuit so as to ignite all the squibs before the circuit is broken at one squib.

The manner in which the present invention solves the aforesaid problem will be hereinafter more fully described.

The words "conforming to one and the same standard" indicate not only the squibs falling under the same model number but also that the each amount of energy for igniting a squib is equal to each others falling under a different model number.

The manner for making the "conforming to one and the same standard" will be described as follows. The resistance of the bridge wire 42 for each squib should be such that the straggling range of the resistance is confined within the tolerances of ±15%.

An important factor for determining the ignition timing is the rate of heat transfer from the bridge wire 42 to the initiating composition 43. A contoured tight engagement between the bridge wire 42 and the initiating composition 43 insures a high rate of heat transfer. Otherwise, the rate of heat transfer is not high.

Figure 3:
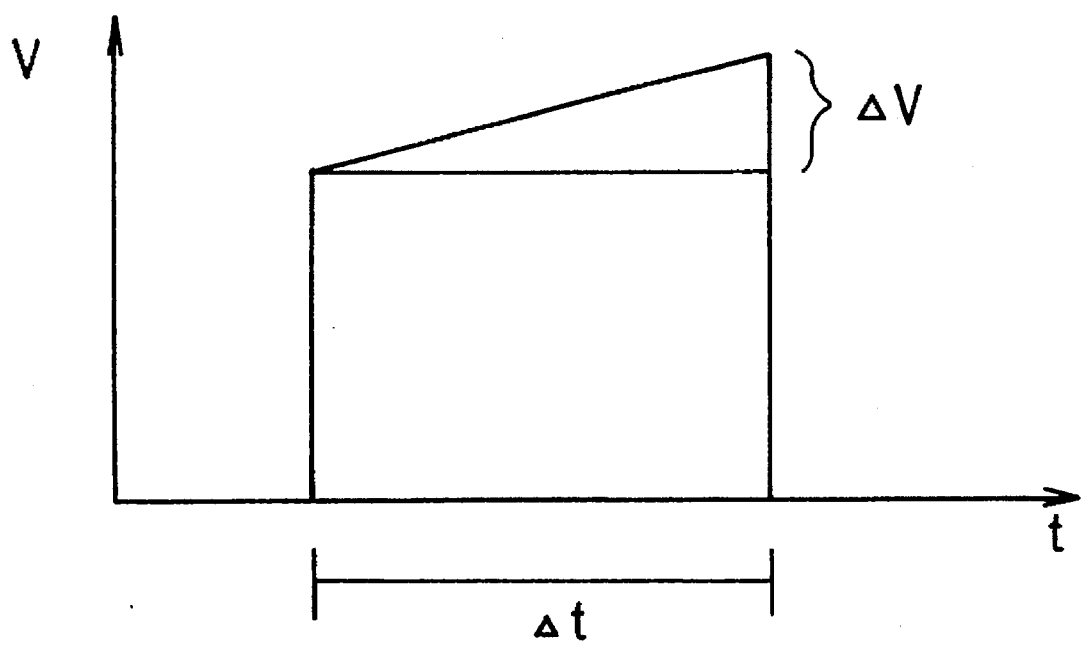
FIG. 3 is a graphical representation to help explain how to evaluate the degree of tightness of engagement between a bridge wire and an initiating composition contained in the squib.

A method of evaluating the degree of tightness of engagement between the bridge wire 42 and the initiating composition 43 will be most clearly understood upon a review of FIG. 3. When a feeble current which does not allow a squib to ignite flows through the bridge wire 42, the temperature of the bridge wire 42 increases and then its resistance increases. Consequently, a difference of an electric potential between two leading wires 46 extending from the squib increases as time goes on. In view of this facts, if the engagement between the bridge wire 42 and the initiating composition 43 is closely tight, the rate of heat transfer will be high and hence the rate of temperature rise in the bridge wire 42 will be low. In this case, the aforesaid difference of an electric potential will be not very great. If the engagement between the bridge wire 42 and the initiating composition 43 is loose, the rate of heat transfer will be low and hence the rate of temperature rise in the bridge wire 42 will be high and then its resistance will increase. In this case, the aforesaid difference of an electric potential will become very great as time goes on. On the basis of these phenomena, a feeble current flows through the bridge wire 42 during an interval $\Delta t$ while a variation $\Delta V$ of the aforesaid difference of electric potential is measured. When the variation $\Delta V$ of each squib falls within a prescribed range, they are one and the same standard with each other. For example, in case of a plurality of squibs are ignitable by 6-millijoule energy obtained from a 1-amp current flowing through a 2-ohm bridge wire during 3-millisecond interval (These conditions will be hereinafter indicated by such as 2 Ω–1A–3 ms), and in case of each voltage increase $\Delta V$ of these squibs falls within a range between 3 and 13 millivolts on the condition that a 0.3-amp current flows through the bridge wire during a 10-millisecond interval, these squibs are judged that they are one and the same standard with each other. In connection with that set forth above, a voltage increase $\Delta V$ of a bare resistance having 2-ohm falls within a range between 27 and 34 millivolts. A large voltage increase is indicative of a loose engagement between the bridge wire 42 and the initiating compositions 43. Consequently, if a squib has a large voltage increase, a straggling range with respect to its igniting time will be wide.

Figure 4:
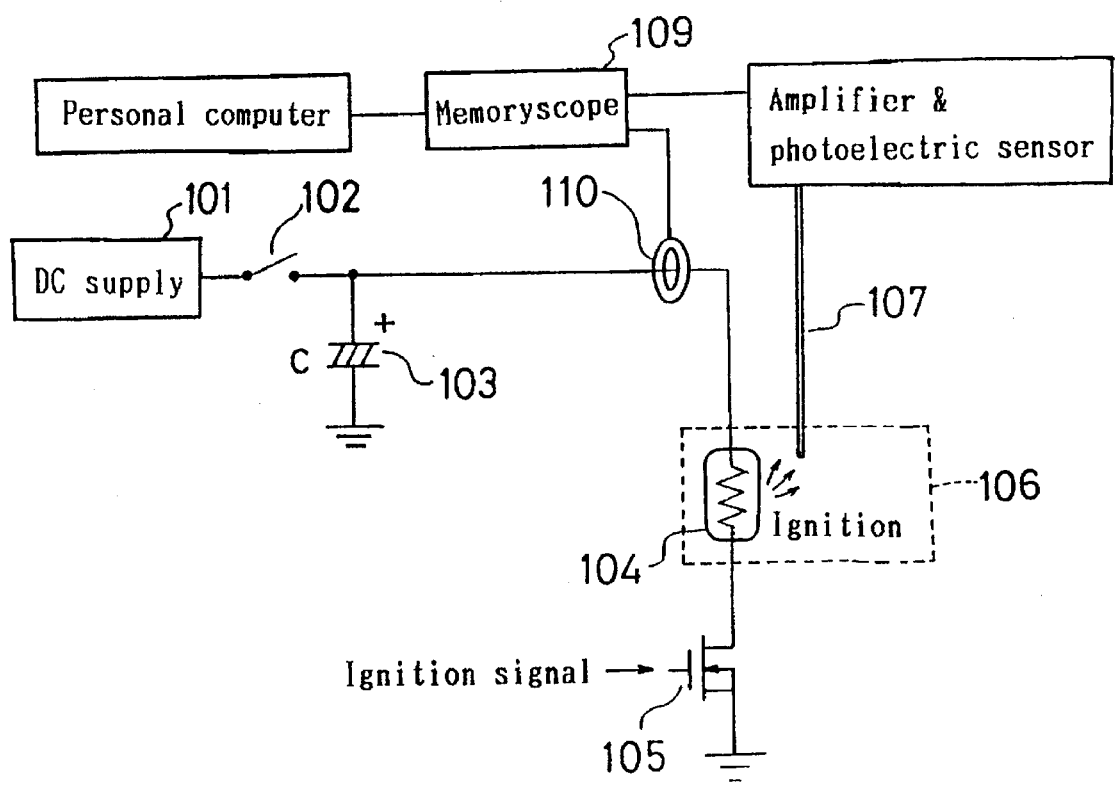
FIG. 4 is a schematic illustration of a circuit utilized for testing the ignition characteristics of the squib.

A circuit as shown in FIG. 4 was utilized for testing the ignition characteristics of the aforesaid squibs. The squib 104 and a semiconductor switch 105 were connected to a power source. The power source comprises a direct-current supply 101, switch 102 and capacitor 103. The direct-current supply 101 and the switch 102 correspond respectively to the battery 1 and the ignition switch 102. The squib 104 is disposed in a hollow container 106 used for ignition. When the squib 104 ignites, a light of the igniting fire is led to a photoelectric sensor 108 through an optical fiber 107. The photoelectric sensor 108 has a amplifier. The photoelectric sensor 108 transforms the light intensity into an voltage. The voltage was fed to a memoryscope 109 so that the variation of the light intensity with time may be recorded. While the probe 110 detects a electric current flowing through the squib 104, the detected electric current was fed to a memoryscope 109 so that the variation of the current intensity with time may be recorded.

Twenty squibs were used for testing the ignition characteristics. Each of these squibs had ignitable conditions as 2 Ω–1A–3 ms and each voltage increase $\Delta V$ of these squibs fell within a range between 3 and 13 millivolts on the condition that a 0.3-amp current flows through the bridge wire during a 10-millisecond interval.

Figure 5A:
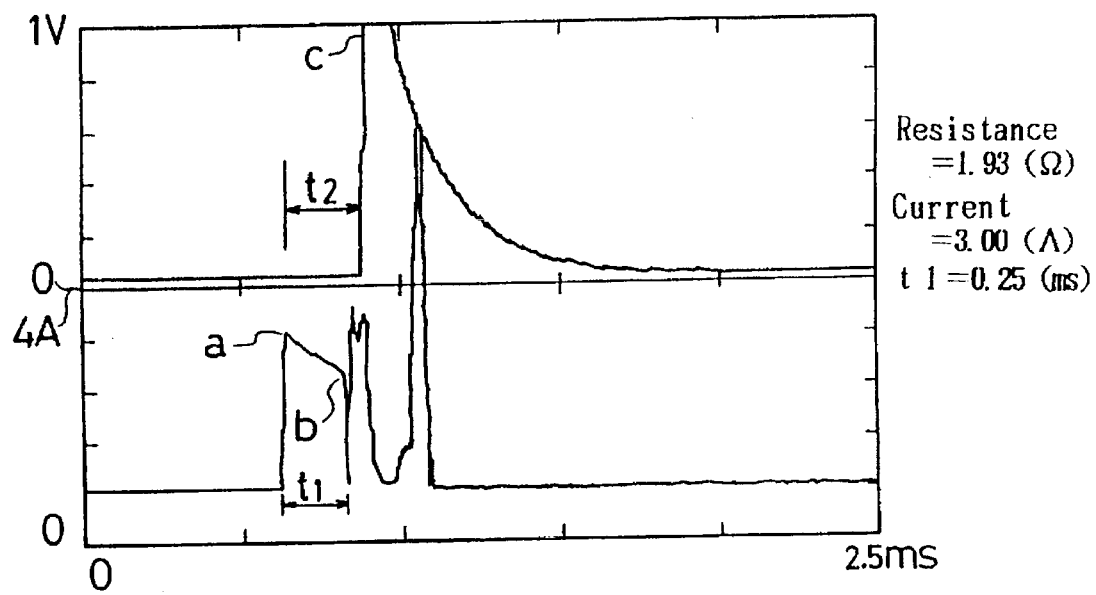
FIG. 5 shows ignition characteristic curves obtained under the condition that a capacitor used as the power source has a discharge characteristic such that the value of the current supplied to the squibs at the time of initial discharge is 3 amp.
Figure 5B:
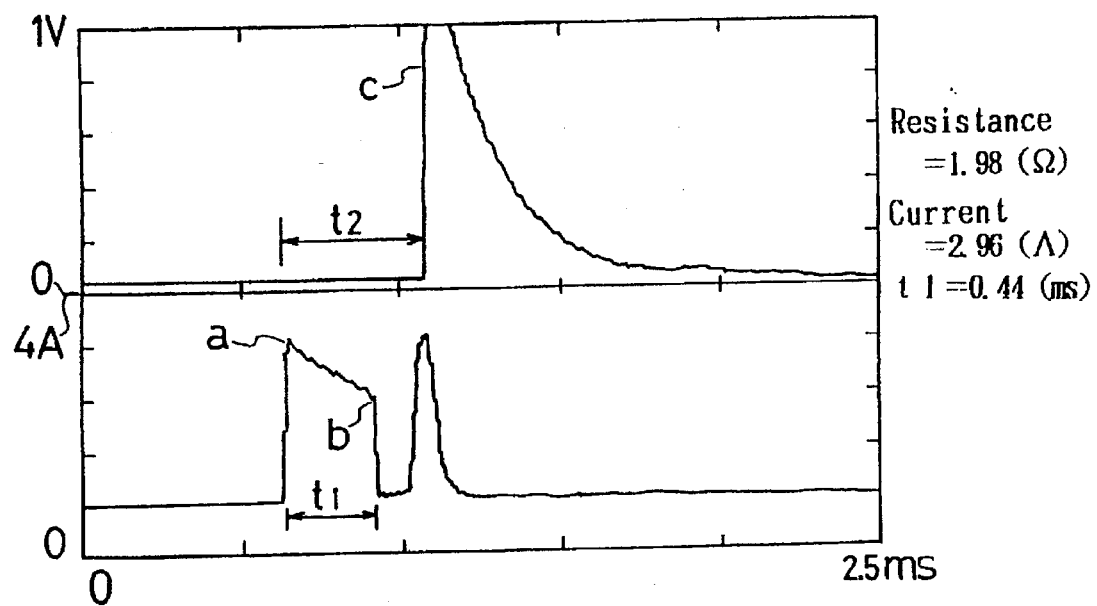

The capacitor 103 had a capacitance of 286 microfarads. An electric current was supplied to the twenty squibs respectively. A value of the electric current was 3 amp at the time of initial discharge. FIG. 5(a) shows an ignition characteristic curve obtained from a squib in which an ignition occurred in the shortest time after energization, while FIG. 5(b) shows an ignition characteristic curve obtained from a squib in which an ignition occurred in the longest time after energization. A discharge from the capacitor 103 started at time a. The current flowing in the squibs gradually decreased in accordance with the discharge characteristic of the capacitor. The current stopped flowing through the squibs at time b. Energization lasted for $t_1$. An ignition occurred at time c, i.e., an ignition occurred at the moment when $t_2$ had elapsed after the start of the discharge from the capacitor 103. Time $t_2$ was longer than $t_1$. This fact means that the bridge wire was melted into a breakage at time b and after then the initiating compositions was ignited. An un-stationary current was flowing after the occurrence of ignition at time $\underline{c}$. This fact indicates that the residue of the chemical reaction of the initiating composition melted into electrically conductive substance at a high temperature. The intensity of this un-stationary current varied too widely. The energy supplied during the interval from $\underline{a}$ to $\underline{b}$ is reliable with respect to the ignition.

Figure 6A:
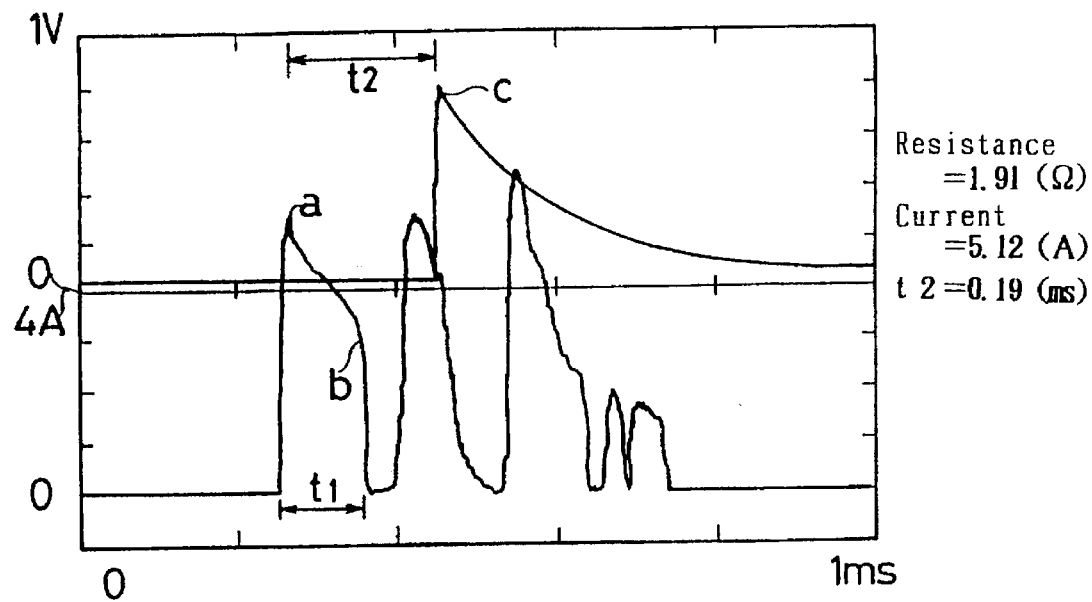
FIG. 6 shows ignition characteristic curves obtained under the condition that a capacitor used as the power source has a discharge characteristic such that the value of the current supplied to the squibs at the time of initial discharge is 5 amp.
Figure 6B:
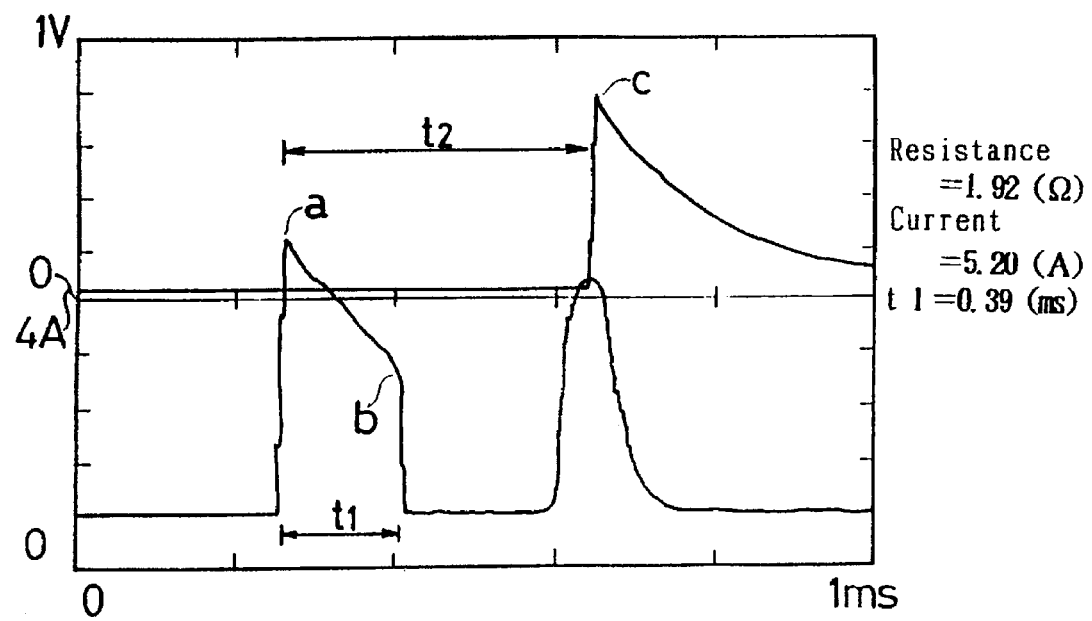

In case of FIG. 6, the capacitor 103 had a capacitance of 92.4 microfarads. An electric current was supplied to the twenty squibs respectively. A value of the electric current was 5 amp at the time of initial discharge. FIG. 6(a) shows an ignition characteristic curve obtained from a squib in which an ignition occurred in the shortest time after energization, while FIG. 6(b) shows an ignition characteristic curve obtained from a squib in which an ignition occurred in the longest time after energization. The difference between $t_1$ and $t_2$ in this case was greater than that in the aforesaid case, where time $t_1$ was also the time when the bridge wire was melted into a breakage after energization and time $t_2$ was also the time when an ignition occurred after a store of energy.

Figure 7A:
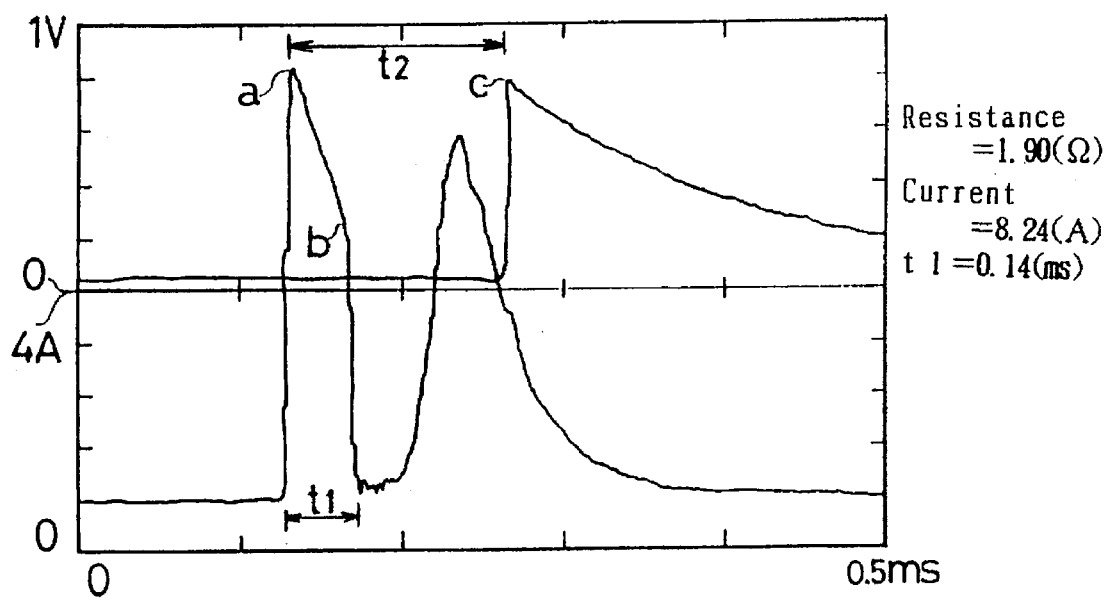
FIG. 7 shows ignition characteristic curves obtained under the condition that a capacitor used as the power source has a discharge characteristic such that the value of the current supplied to the squibs at the time of initial discharge is 8 amp.
Figure 7B:
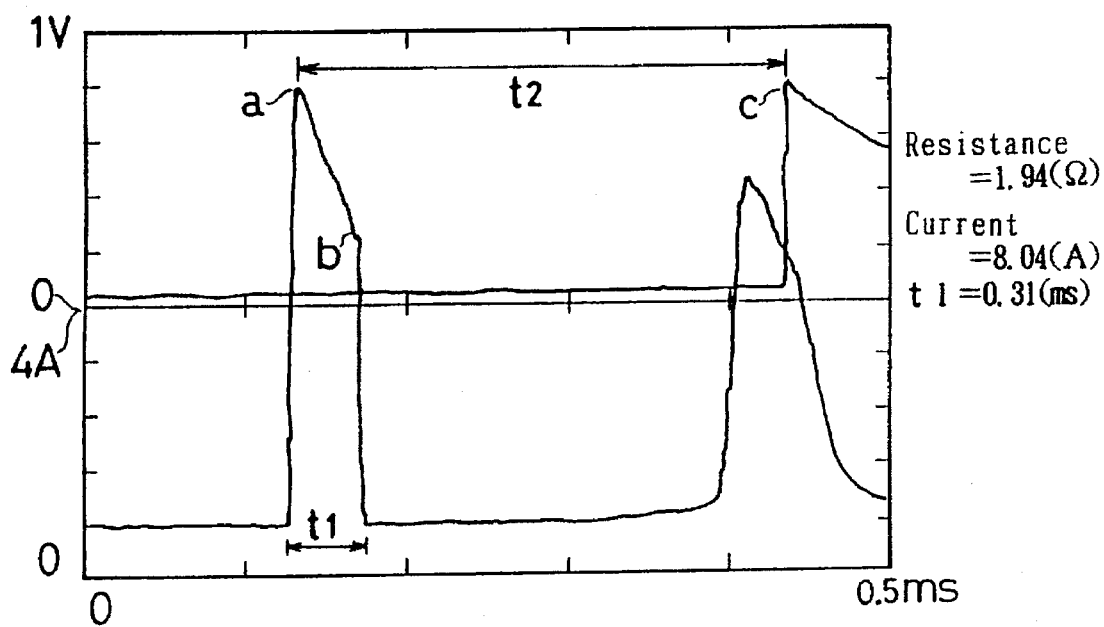

In case of FIG. 7, the capacitor 103 had a capacitance of 31.3 microfarads. An electric current has supplied to the twenty squibs respectively. A value of the electric current was 8 amp at the time of initial discharge. FIG. 7(a) shows an ignition characteristic curve obtained from a squib in which an ignition occurred in the shortest time after a store of energy, while FIG. 7(b) shows an ignition characteristic curve obtained from a squib in which an ignition occurred in the longest time after energization. The difference between $t_1$ and $t_2$ in this case was greater than that in the aforesaid case, where time $t_1$ was also the time when the bridge wire was melted into a breakage after a store of energy and time $t_2$ was also the time when an ignition occurred after a store of energy.

From the foregoing, when a current of 3 amp or more flows through a squib having ignitable condition as 2 $\Omega$–1A–3 ms, the bridge wire is melted into a breakage at first, a ting time goes, and then a initiating composition is ignited. The greater the initial discharge from the capacitor, the more strongly the above fact appears. The bridge wire is instantaneously heated and melted like a fireball with breakage when a large amount of current is supplied to the bridge wire. And an energy is supplied to the initiating composition through the bridge wire which is converted into a fireball. The loss of energy is held down to the minimum in this manner.

When a plurality of squibs are connected in series with each other and a current of 3 amp or more flows through them, each squib is charged with a prescribed energy with a comparatively stable state of the melted and broken bridge wire like a fireball. Squibs conforming to one and the same standard are applied because these squibs enables the straggling range of an amount of a charged energy to be narrower and thereby insure that all the squibs are ignited without fail. The aforesaid one and the same standard requires the straggling range of the resistance of each bridge wire falling within a prescribed range and the degree of tightness of engagement between the bridge wire and the initiating composition falling within a prescribed range in addition to the aforesaid fundamental conditions for 2 $\Omega$–1A–3 ms.

The contents of the cylinder 41 shown in FIG. 2 may take various forms. For example, the contents thereof may comprise several successive layers formed of a lower layer of the initiating composition 43, an intermediate layer of a delay composition, and an upper layer of the initiating composition 43, and so on. The lower layer of the initiating composition 43 is ignited when the bridge wire 42 is heated by a current flowing therethrough. A combustion reaction proceeds upwardly, and a propagation velocity of the combustion reaction slows down when it reaches the intermediate layer of the delay composition which is a mixture of an oxidizing agent and a reducing agent. When the combustion reaction reaches to the upper layer of the initiating composition 43, its propagation velocity will be again the same velocity as the lower layer.

The top end wall of the cylinder 41 is torn along an indentation and the enhancer 47 is ignited by a flame projected from the tear when all the initiating composition 43 has been burnt and the internal pressure of the cylinder 41 has come up to a prescribed indentation. The ignition of the squib is delayed by the slowing down propagation velocity of the combustion reaction at the intermediate layer of the delay composition. The delay time can be adjusted by employing the various amount or kind of the delay composition. Consequently, each of timings for actuating airbags can be adjusted in spite of the simultaneous energization of a plurality of squibs connected in series with each other. This adjustability yields an effect when, e.g., it is necessary to adjust the timing for actuating a passenger's airbag against a driver's airbag.

Figure 8:
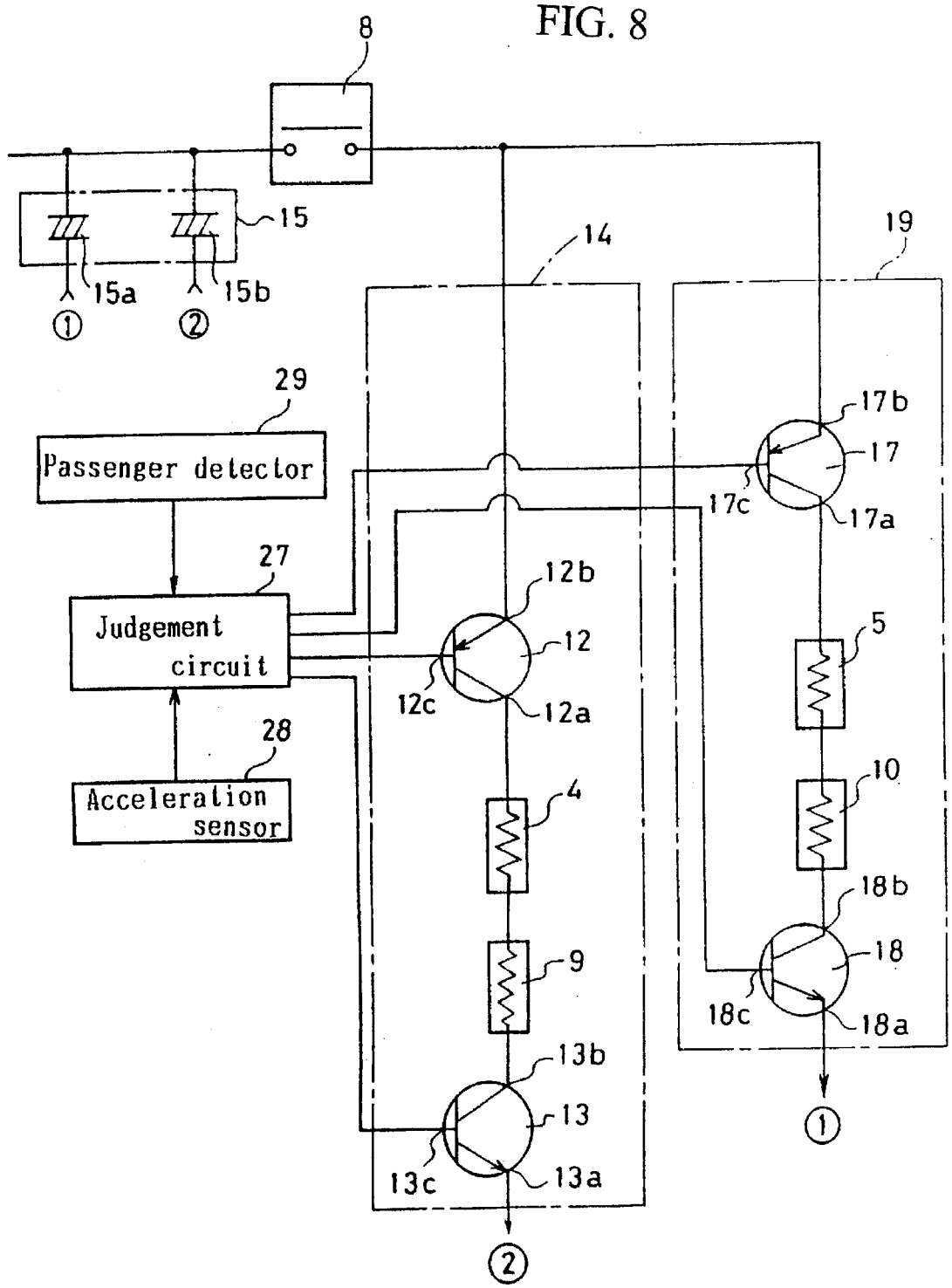
FIG. 8 is a schematic illustration of another circuit utilized in this invetion.

A modified form of the circuit utilized for energizing the squibs is illustrated in FIG. 8. An important feature of this modified form is that the circuit has first and third squibs 4 and 5 for actuating airbags and second and fourth squibs 9 and 10 for actuating a pretensioner of seat belts.

The working unit 14 for a driver includes the first squib 4, the second squib 9, a first transistor 12 and a second transistor 13 so as to actuate the airbag and the pretensioner of the seat belt provided at the driver's seat.

The first transistor 12, the first squib 4, the second squib 9 and the second transistor 13 are serially connected in this order in the working unit 14. Both of the bases 12c, 13c of the first and second transistor 12 and 13 are connected to the judgment circuit 27 for judging an event to be a collision. Connections (ON state) between emitters 12b, 13a and collectors 12a, 13b are respectively established by signals of the judgment circuit 27 to actuate the squibs at the driver seat.

On the other hand, the working unit 19 for passenger includes the third squib 5, the fourth squib 10, a third transistor 17 (a means for restraining at passenger' seat) and a fourth transistor 18 (a means for restraining at passenger' seat) so as to actuate the airbag and the pretensioner of the seat belt provided at the passenger's seat. The working unit 19 has an identical construction with the working unit 14. Connections (ON state) between emitters 17b, 18a and collectors 17a, 18b of the third and forth transistors 17, 18 are respectively established by signals of the judgment circuit 27 to actuate the squibs at the other passenger's seat.

The working units 14 and 19 are connected in parallel with each other and this parallel circuit is connected to one plate of capacitor 15 through the safety sensor 8. the emitters 13a, 18a of the second and forth transistors 13, 18 are connected to other plate of the capacitor 15. At the time of a collision, the safety sensor 8 is mechanically closed so that electrical energy stored in the capacitor 15 may be supplied to the working units 14 and 19.

Both of a passenger detector 29 and the acceleration sensor 28 are also connected to the judgment circuit 27 which is connected to the both of above working units 14 and 19. The passenger detector 29 detects someone occupying the passenger's seat and the acceleration sensor 28 outputs an acceleration signal in the form of a voltage or a current in response to the acceleration.

The above passenger detector 29 judges whether the passenger's seat has an occupant or not, and then outputs a signal when judging that the seat has the occupant. There are some concrete means from which the passenger detector 29 judges whether the passenger's seat has an occupant or not. One of them is the means for judging whether the seat belt is locked or not, another of them is the manual operation of a switch by a passenger, further another of them is the passenger sensor such as a photoelectric sensor, an ultrasonic sensor or a pressure sensor. A photoelectric sensor and an ultrasonic sensor belong to a noncontact type. A pressure sensor is a contact type. Combination of two or more aforesaid means are allowable as the passenger detector 29 to judge whether the passenger's seat has the occupant or not. It is desirable that a manual switch is provided so as to stop outputting a passenger signal forcedly even when the passenger detector 29 automatically detects someone occupying the passenger's seat. For example, the manual switch is required when a child's seat is mounted on the passenger's seat because the passenger detector 29 detects something occupying the passenger's seat but the airbag and the pretensioner of the seat belt should not be actuated in this case.

The judgment circuit 27 comprises an arithmetic unit, a memory unit, an AND-circuit with two input terminal, and an I/O device (input-output device). The arithmetic unit stores various working programs such as a routine for judging of accelerations. The judgment circuit 27 makes the I/O device convert the acceleration signal data into a digital value. The judgment circuit 27 also makes the arithmetic unit compare the digital value of the acceleration with a prescribed value by executing the judgment routine. The arithmetic unit judges that the collision is serious enough when the digital value of the acceleration is greater than the prescribed value and then develops two kinds of collision signals. One of them is the signal to actuate the airbags and the pretensioners of the seat belts for the driver, the other of them is the signal to actuate the airbags and the pretensioners of the seat belts for the passenger.

The actuation signal developed for the driver is fed to the working unit 14 for the driver. The actuation signal developed for the passenger is fed to one of the two input terminals of the AND-circuit. The other of the two input terminals of the AND-circuit is fed with the passenger signal developed by the passenger detector 29 when it detects someone occupying the passenger's seat. The AND-circuit makes a logical product between the actuation signal and the passenger signal. The AND-circuit produces an output signal to be fed to the working unit 19 in case of both the actuation signal and the passenger signal being input into the AND-circuit at the same time.

While the judgment circuit 27 has been described particularly in connection with a combination of software such as a routine for judging of accelerations and hardware such as an AND-circuit, the judgment circuit 27 may be readily replaced by other circuits such as the one in which control over the signals to be fed to the working units is effected solely by software.

More specifically stated, the judgment circuit 27 may be designed so as to execute a routine for judging whether a signal has been received from the passenger detector 29 or not after the routine for judging of accelerations has been executed, where the actuation signals for the driver and passenger are outputted when a passenger signal from the passenger detector 29 is found or the actuation signal only for the driver is outputted when a passenger signal from the passenger detector 29 is not found.

In this situation, the passenger detector 29 functions either when an automobile engine is started or when the automobile begins to run, which judges whether someone has occupied the passenger's seat or not, i.e., whether it is necessary to develop a signal for actuating the working unit 19 or not. In case it is necessary to actuate the working unit 19, the passenger detector 29 transmits a passenger signal to the judgment circuit 27. On the other hand, in case of no one occupying the passenger's seat, the passenger detector 29 does not transmit a passenger signal to the judgment circuit 27.

When an impact due to a collision or the like is given to an automobile, the safety sensor 8 is closed by large acceleration and the acceleration sensor 28 outputs an acceleration signal in the form of a voltage or a current proportional to the acceleration. The acceleration signal is fed to the judgment circuit 27, in which it is compared with a prescribed value. When the acceleration signal data is greater than the prescribed value, the collision is judged as being serious enough to actuate the airbags and the pretensioners of the seat belts.

After that, the judgment circuit 27 judges whether a signal has been received from the passenger detector 29 or not. When a signal from the passenger detector 29 is found, the judgment circuit 27 outputs actuation signals respectively to the working units 14 for the driver and the working units 19 for the passenger.

Then the current flowing out of the capacitor 15 is allowed to flow through the working units 14 and 19 so as to ignite all the squibs 4, 5, 9 and 10 and thereby actuate the airbags and the pretensioners of the seat belts for protecting the driver and the passenger.

When a signal from the device 29 is not found, the judgment circuit 27 outputs a signal only to the working unit 14 for the driver.

The current flowing out of the capacitor 15 is allowed to flow through the working unit 14 so as to ignite the squibs 4 and 9 and thereby actuate the airbag and pretensioner of the seat belt for the driver.

In place of a single capacitor 15, first and second capacitors 15a and 15b may be alloted to the working units 19 and 14 respectively as the working unit 14 separates from the working unit 19. In this case, each of current flowing out of the first and second capacitor 15a and 15b are allowable to flow independently through the working unit 19 and 14 respectively.

Figure 9:
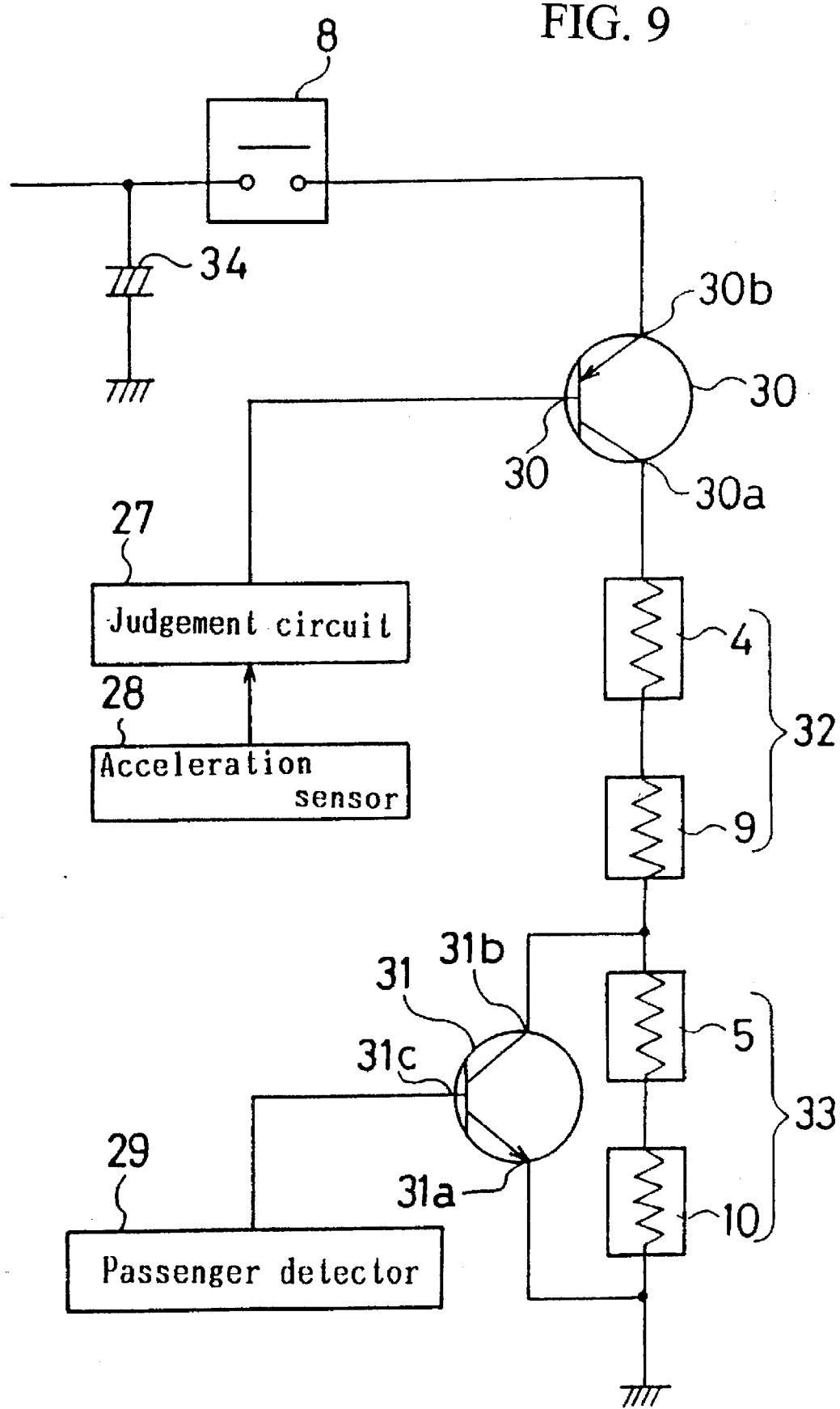
FIG. 9 is a schematic illustration of still another circuit utilized therefor.

A further modified form of the circuit utilized for energizing the squibs is illustrated in FIG. 9. An important feature of this form is that the four squibs 4, 5, 9 and 10 are connected in series with each other. The first and second squibs 4 and 9 are included in a working unit 32 for a driver, while the third and fourth squibs 5 and 10 are included in a working unit 33 for the passenger. A collector 30a of a first transistor 30 is connected to an input terminal of the first squib 4.

An emitter 30b of the first transistor 30 is connected to a capacitor 34 through the safety sensor 8. A base 30c of the first transistor 30 is connected to the judgement circuit 27. On receipt of an acceleration signal from the acceleration sensor 28, the judgement circuit 27 judges whether a collision is serious enough to actuate the airbags and the pretensioners of seat belts or not. When the collision is judged as being serious enough, the judgement circuit 27 produces a base current so that a current may flow from the emitter 30b to the collector 30a (ON state).

The input terminal of the third squib 5 is connected to a collector 31b of a second transistor 31. An output terminal of the fourth squib 10 is connected to an emitter 31a of the second transistor 31. The passenger detector 29 is connected to a base 31c of the second transistor 31. In case that the passenger detector 29 prevents the working unit 33 for the passenger from actuating, the passenger detector 29 produces a base current so that a current may flow from the collector 31b to the emitter 31a (ON state) whereby the current from the second squib 9 by-passes through the second transistor 31 without flowing into the working unit 33.

In this situation, the passenger detector 29 functions either when an automobile engine is started or when the automobile begins to run. And, for example, the passenger detector 29 produces a base current so that a current may flow from the collector 31b to the emitter 31a (ON state) when the passenger's seat is not occupied by anyone. On the other hand, the passenger detector 29 does not produce a base current so that a current may not flow from the collector 31b to the emitter 31a (OFF state) when the passenger's seat is occupied by someone.

When an impact due to a collision or the like is given to an automobile, the safing sensor 8 is closed by large acceleration and the acceleration sensor 28 outputs an acceleration signal proportional to the acceleration. The acceleration signal is fed to the judgment circuit 27, in which it is compared with a prescribed value. When the acceleration signal data is found to be greater than the prescribed value, the collision is judged as being serious enough to actuate the airbags and the pretensioners of the seat belts.

After that, the judgment circuit 27 produces a base current so that a current may flow from the emitter 30b to the collector 30a of the first transistor 30 (ON state), whereby the airbags and the pretensioners of the seat belts for both the driver and the passenger become actuatable state. And in case that the passenger's seat is not occupied by anyone, the passenger detector 29 also produces a base current for the second transistor 31, whereby the airbag and the pretensioner of the seat belt only for the driver become actuatable state.

As shown in FIGS. 8 and 9, the present invention is what comprises a plurality of squibs which are incorporated in a plurality of safety devices for protecting vehicle occupants such as airbags and pretensioners of the seat belts each provided at the driver's seat and the passengers' seat, wherein the first and second squibs 4 and 9 actuate the safety devices for the driver are connected in series with each other and also the third and forth squibs 5 and 10 actuate the safety devices for the passenger are connected in series with each other and further the actuation of these safety devices is effected by allowing one current to flow through the all squibs 4, 5, 9 and 10. Thus the necessity for individual control over the actuation of the safety device is obviated, so that the circuits can be simply designed.

And also, the present invention consists of what controls actuating a plurality of safety devices for protecting vehicle occupants such as airbags and pretensioners of the seat belts each provided at the driver's seat and the passengers' seat. To materially explain, the present invention as shown in FIG. 8 comprises driver side working means for control to actuate the safety devices at a driver's seat such as working unit 14, passenger side working means for control to actuate the safety devices at a passenger's seat such as working unit 19, restraining means such as the third and fourth transistors 17 and 18 for restraining the safety devices at a passenger's seat, acceleration judgement means such as judgement circuit 27 and so on working for both the a driver side working means and a passenger side working means when the acceleration detected by the acceleration sensor 28 exceeds a prescribed level.

Consequently, the safety devices for the driver can be actuated apart from the safety devices for the passenger. An ability to actuate only the safety devices for the driver gives effect to prevent the safety devices for the passenger from actuating in vain when any occupant is not found at the passenger's seat and also effect to avert a danger when a child's seat mounted on the passenger's seat with its front to the passenger's seat.

Further, both the driver side working means and the passenger side working means have a plurality of squibs such as first and second squibs 4, 9 and the third and forth squibs 5, 10 respectively which are ignites as a current flows through from a single power source. The first and second squibs 4 and 9 are connected in series with each other and also the third and forth squibs 5 and 10 connected in series with each other, whereby the amount of a current from the power source to all squibs can be reduced.

In addition, the driver side working means and the passenger side working means are connected with each other so as to form a parallel circuit and then this parallel circuit is connected to the power source such as a capacitor 15. This capacitor 15 can consist of such as a plurality of capacitors 15b, 15a which are allotted to the driver side working means and the passenger side working means respectively. Thus, divided each power source into the passenger side working means and the driver side working means is enables the safety devices for passenger to only actuate when it is necessary to actuate.

In case of the embodiment shown in FIG. 9, two working units 32, 33 and a power source such as a single capacitor 34 are connected in series with each other, therefor, the amount of a current from the power source to all squibs can be more reduced.

FIELD OF INDUSTRIAL UTILIZATION

The present invention is suitable for the case where a single common apparatus is used for actuating the safety devices for both the driver and the passenger and further wherein the safety devices are different kinds of the safety devices such as an airbag, pretensioner of seat belt, etc.

We claim:

1. an apparatus for actuating a plurality of safety devices equipped in a vehicle for protecting occupants from an impact of a collision, comprising:

a plurality of squibs included in said plurality of safety devices respectively, which are connected in series with each other so as to form a series circuit, said series circuit having no bypass means in parallel to said squibs for supplying an igniting energy to said squibs, and ignited by a current flowing therethrough and conforming to one and the same standard with respect to each other, a power source for supplying electrical energy to said series circuit, and a collision detector for allowing a current to flow from the power source to said series circuit when detecting a collision; wherein a required energy for igniting all of said squibs in said series circuit is supplied to said squibs from said power source before said series circuit opens electrically at any one squib of said plurality of squibs.

2. An apparatus as defined in claim 1, wherein for each of said squibs conforming to one and the same standard:

resistances of bridge wires thereof engaging an initiating composition in the squib fall within a prescribed range, and each is selected such that a voltage build-up rate measured with a feeble current flowing through said bridge wire in a prescribed time falls within a prescribed range, whereby a tightness of engagement between said bridge wire and said initiating composition of said plurality of squibs is controlled.

3. An apparatus as defined in claim 1, wherein a current flows through said series circuit of squibs till a bridge wire in one squib is melted into a breakage, all the squibs start igniting by energy supplied to each squibs before said bridge wire is melted into a breakage.

4. An apparatus as defined in claim 1, wherein said series circuit includes a plurality of squibs actuating respectively the different kinds of safety devices such as air bags and pretensioners of seat belts.

5. An apparatus as defined in claim 1, wherein said series circuit includes a plurality of squibs actuating respectively the different kinds of safety devices for protecting a passenger except a driver, and further comprising a passenger detector for detecting a passenger at a passenger's seat, and a restraining means to restrain flowing a current through the series circuit so as not to actuate the safety devices at the passenger's seat when the passenger detector does not find any occupants at the passenger's seat.

6. An apparatus as defined in claim 1, wherein said series circuit includes a plurality of squibs actuating the safety devices for protecting both a passenger and a driver, and further comprising a passenger detector for detecting a passenger at a passenger's seat, and a restraining means to restrain flowing a current through the squibs for the passenger so as not to actuate the safety devices at the passenger's seat when the passenger detector does not find any occupants at the passenger's seat.

7. An apparatus as defined in claim 2, wherein said prescribed range is established on the basis of two ohms as standard, and said power source includes a capacitor which initially discharges a supplying electric current of at least three amps to said squibs.

* * * * *